May 15, 1934.  S. Z. RAPEANU  1,958,863
TREATING TOBACCO LEAF
Filed May 5, 1932
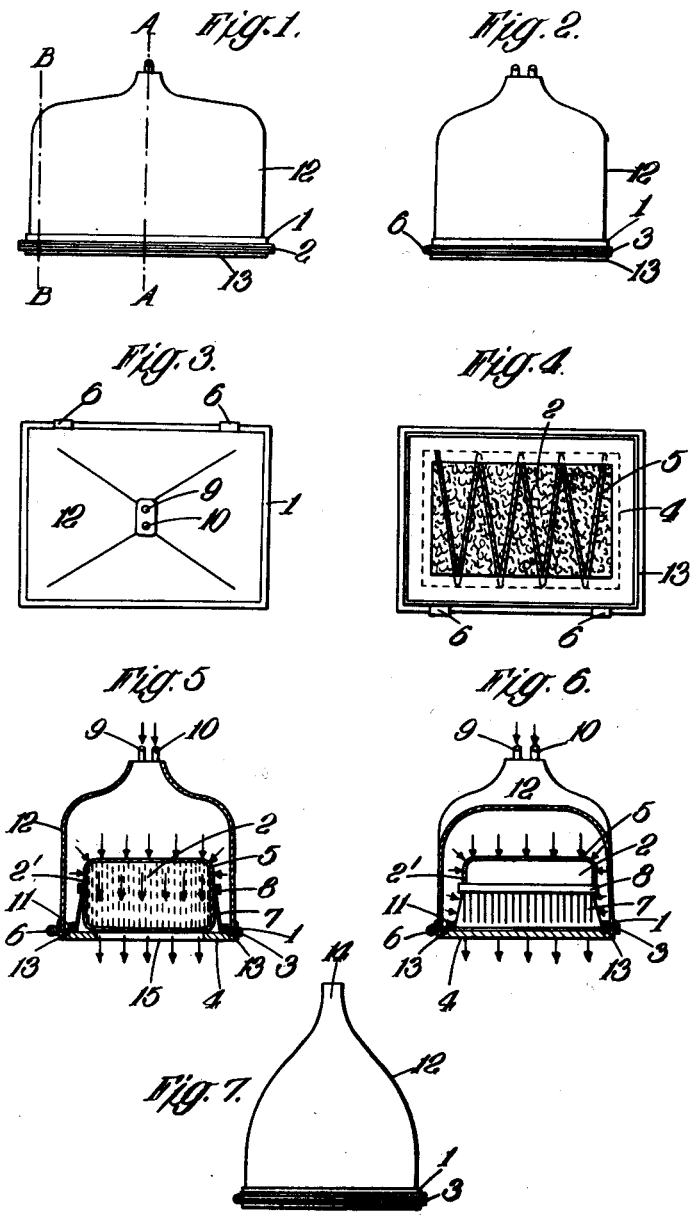
STELIAN ZAHEU RAPEANU
INVENTOR.
BY Haseltine, Lake & Co
ATTORNEYS Patented May 15, 1934

1,958,863

UNITED STATES PATENT OFFICE 1,958,863

TREATING TOBACCO LEAF

Stelian Zaheu Rapeanu, Belvedere, Bucharest, Rumania, assignor to Cassa Autonoma a Monopolurilor Regatului Romaniei, Bucharest, Rumania, a Rumanian state institution Application May 5, 1932, Serial No. 609,382
In Rumania February 4, 1932

5 Claims. (Cl. 131—55)

This invention concerns a process for treating tobacco leaf whereby tobacco leaf in bales is given the moisture content needed for the subsequent manufacturing processes and in order that the invention may be clearly understood it will be explained briefly the treatment that is given as a general rule to raw tobacco that is to say tobacco in leaf by the grower and the manufacturer.

The grower, in order to preserve raw tobacco in the best conditions, lowers the moisture content of the fermented leaves to 9%–11% of their weight, thus preventing the growth of mould, and then presses the leaves into bales of a size easy to handle.

Should the manufacturer however start subsequent operations on the dry leaves as they come from the bales the leaves would crumble and become unusable. The manufacturer therefore, endeavours to give to the leaves the suppleness required for the manufacturing operations by raising the moisture content thereof to 14%–16% of their weight.

The processes now used, both in Rumania and in other countries which manufacture tobacco similar to Rumanian, to raise the moisture content of the leaves to the most adequate percentage, have three great defects:

1. The processes do not prevent the breaking of the leaves when being taken from the bale in a dry state in order to be subjected to a moistening process, and it has been found that 1%–2% of the leaves are broken during the separation of the leaves from bale form.

2. The processes do not effect a sufficiently even moistening of all the leaves as those in the middle of the bundles get less moisture than the outer ones.

3. The processes require a long period of time to function, much labour and too ample or unnecessary amount of equipment.

The object of the process according to the invention is to treat tobacco leaves whilst packed in bales whereby the leaves are given the moisture content needed for their subsequent manufacture and thereby eliminates the above mentioned defects as it may be seen from the following description.

The process consists essentially in forcing through the bale of tobacco, namely through the spaces between the bundles of leaves, between the leaves of the bundle or between the layers of pressed leaves, moist air under pressure, in sufficient quantity and at a predetermined temperature, in order to impart to all the leaves the percentage of water desired. The admission of moist air under pressure is made at one of the sides of the bale and the outlet preferably at the oppositely disposed side.

Air of a relative humidity of 85%–90%, at the temperature adjusted to each quality of tobacco (30° C. for the better qualities; for the others it may be even higher), under a pressure less than one and a half an atmosphere, brings in 15–30 minutes the driest bale to the best condition for the manufacture of the leaves.

The invention is not limited to any particular apparatus for applying the process described but as an example of such apparatus reference is directed to the accompanying drawing which illustrates certain apparatus which has been used by the applicants and wherein Figure 1 is a front view of a conditioning bell,
Figure 2 is a side view of Figure 1,
Figure 3 is a plan of Figure 1,
Figure 4 is an under plan of Figure 1,
Figure 5 is a cross-section on the line A—A of Figure 1,
Figure 6 is a cross-section on the line B—B of Figure 1 and
Figure 7—a modification of the shape of the bell.

The apparatus shown in the drawing is used as follows:—

A bale of raw tobacco 2 as it comes from the storehouse, wrapped in cloth on all sides 2' and secured by means of cords 5 is introduced into the metal bell 12 and placed on wooden frame 4. In order to effect this operation the bell is arranged to swing on hinges 6 in order to permit placing the bale on the frame. Around the bale is fitted an elastic belt 8 to which the upper edge of an airproof elastic cloth band 7 is secured, the lower edge of the cloth being also fixed to the wooden frame 4 by means of a wooden lath 11. Both cloth band and belt are elastic in order to fit bales of different sizes.

After the bale has been placed in position as above, the metal bell is brought again to rest on the wooden frame.

In order to avoid any leakage of air from inside to outside the bell, it is provided with gasket 3 which is pressed between the L-shaped iron edge 1 of the bell which latter also gives to the bell the necessary stiffness and T-shaped metal rim 13 of the wooden frame 4.

After the bell has been air-tightly fixed on the frame 4, compressed moist air is introduced through the pipes 9 and 10, which air finding no other outlet is forced to pass through the bale of tobacco from one side to the other (Figure 5 and Figure 6) issuing through the opening 15 of the frame 4. While passing through the bale, the air gives up almost all its moisture content to the tobacco leaf, which is hygroscopic, so that after 15-30 minutes the leaves may be handled without suffering the slightest damage.

On Figure 7 is shown a bell of a shape which avoids a sudden expansion of the compressed moist air which is supplied through a single pipe 14.

What I claim and desire to secure by Letters Patent of the United States is:—

1. A process for the treatment of tobacco leaf when confined consisting in forcing moist air under pressure through the leaf in bale whereby the water content of the leaf is raised for manufacturing purposes.

2. A process for the treatment of tobacco leaf consisting in forcing moist air of a relative humidity of 85% to 90% through the leaf when confined in bale whereby the water content of the leaf is raised for manufacturing purposes.

3. A process for the treatment of tobacco leaf consisting in forcing moist air under pressure through the leaf when confined in bale at a temperature of 30° C., whereby the water content of the leaf is raised for manufacturing purposes.

4. A process for the treatment of tobacco leaf consisting in forcing moist air under pressure through the leaf when confined in bale at a predetermined temperature for a period of 15 to 30 minutes, whereby the water content of the leaf is raised for manufacturing purposes.

5. A process for the treatment of tobacco leaf consisting in forcing moist air under pressure through the leaf when confined in bale from one side of the bale to the oppositely disposed side thereof at a predetermined temperature for a predetermined time, whereby the water content of the leaf is raised for manufacturing purposes.

STELIAN ZAHEU RAPEANU.